United States Patent
Korich et al.

(10) Patent No.: US 7,717,747 B2
(45) Date of Patent: May 18, 2010

(54) POWER INVERTER CONNECTOR HAVING INTEGRATED CURRENT SENSORS

(75) Inventors: Mark D. Korich, Chino Hills, CA (US); Mark L Selogie, Manhattan Beach, CA (US); Young Doo, La Palma, CA (US); Erik Hatch, Cypress, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 797 days.

(21) Appl. No.: 11/556,741

(22) Filed: Nov. 6, 2006

(65) Prior Publication Data
US 2008/0105476 A1    May 8, 2008

(51) Int. Cl.
*H01R 13/66* (2006.01)
(52) U.S. Cl. .................. 439/620.01; 439/34
(58) Field of Classification Search ............ 439/34, 439/620.1, 620.08; 903/915
See application file for complete search history.

(56) References Cited
U.S. PATENT DOCUMENTS

| | | | | |
|---|---|---|---|---|
| 6,249,448 | B1 * | 6/2001 | Regnier et al. | 361/821 |
| 6,315,580 | B1 * | 11/2001 | Hurtubise et al. | 439/82 |
| 6,621,701 | B2 * | 9/2003 | Tamba et al. | 361/699 |
| 7,144,280 | B2 * | 12/2006 | Cabrera et al. | 439/709 |
| 7,187,568 | B2 * | 3/2007 | Radosevich et al. | 363/144 |
| 2006/0232942 | A1 * | 10/2006 | Nakatsu et al. | 361/710 |

* cited by examiner

*Primary Examiner*—Briggitte R Hammond
(74) *Attorney, Agent, or Firm*—Ingrassia Fisher & Lorenz, P.C.

(57) ABSTRACT

A vehicular power inverter connector assembly is provided. The assembly includes a housing, a plurality of first engagement formations on the housing shaped to mate with a plurality of inverter engagement formations on a vehicular power inverter, a plurality of second engagement formations on the housing shaped to mate with a plurality motor engagement formations on a vehicular motor, and a plurality of current sensors connected to the housing and configured to detect current flowing between the vehicular power inverter and the vehicular motor.

20 Claims, 5 Drawing Sheets

POWER INVERTER CONNECTOR HAVING INTEGRATED CURRENT SENSORS

TECHNICAL FIELD

The present invention generally relates to an inverter connector assembly, and more particularly relates to an inverter connector assembly for use in automobiles.

BACKGROUND OF THE INVENTION

In recent years, advances in technology, as well as ever evolving tastes in style, have led to substantial changes in the techniques used to design and build automobiles. One of the changes involves the complexity of the various electrical systems within automobiles. As a result, electrical systems in automobiles, especially hybrid vehicles, are using an ever increasing amount of electrical power.

Many of the electrical components, such as electric motors, used in such vehicles receive electrical power from alternating current (AC) power supplies. However, the power sources (i.e., batteries) used in such applications only provide direct current (DC) power. Thus, devices known as power inverters are used to convert the DC power to AC power.

The current flowing from the power inverter to the motor, or other electric component, is typically monitored to ensure proper operation. Conventional power inverters utilize one or more wiring harnesses and a bundle a wires to connect the power inverter to a current sensor, and in turn connect the current sensor to the motor. The wiring harnesses and external current sensor increase the overall size of the power inverter, as well as add to the complexity of installing and servicing the power inverter. Additionally, because of the large amounts of power involved, high performance wiring harnesses are typically used, which significantly adds to the costs of manufacturing the vehicle.

Accordingly, it is desirable to provide a power inverter connector with an integrated current sensor that reduces the size and complexity of the power inverter. In addition, it is desirable to provide a power inverter assembly that eliminates the need for the wiring harnesses. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A vehicular power inverter connector assembly is provided. The assembly includes a housing, a plurality of first engagement formations on the housing shaped to mate with a plurality of inverter engagement formations on a vehicular power inverter, a plurality of second engagement formations on the housing shaped to mate with a plurality motor engagement formations on a vehicular motor, and a plurality of current sensors connected to the housing and configured to detect current flowing between the vehicular power inverter and the vehicular motor.

An automotive drive system is provided. The system includes a frame, an actuator coupled to the frame having a plurality of actuator engagement formations, an automotive power inverter, and a connector assembly. The connector assembly includes a housing having first and second opposing sides, a plurality of first engagement formations on the first side of the housing and connected to the automotive power inverter, a plurality of second engagement formations on the second side of the housing mated with the plurality of actuator engagement formations on the actuator to releasably attach the housing to the actuator, a plurality of conductors connected to the housing, each conductor interconnecting a respective one of the first engagement formations and a respective one of the second engagement formations, and a plurality of current sensors connected to the housing, each current sensor configured to detect current flowing between the automotive power inverter and the actuator through a respective conductor.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

FIG. 1 to FIG. 5 illustrate a vehicular power inverter connector assembly. The assembly includes a housing having engagement formations that are shaped to mate with engagement formations on a vehicular power inverter to connect the housing to the power inverter. The housing also has engagement formations that are shaped to mate with engagement formations on a vehicular motor to connect the housing to the power inverter. Current sensors are integrated into the connector assembly to detect current flowing between the vehicular power inverter and the vehicular motor.

Figure 1:
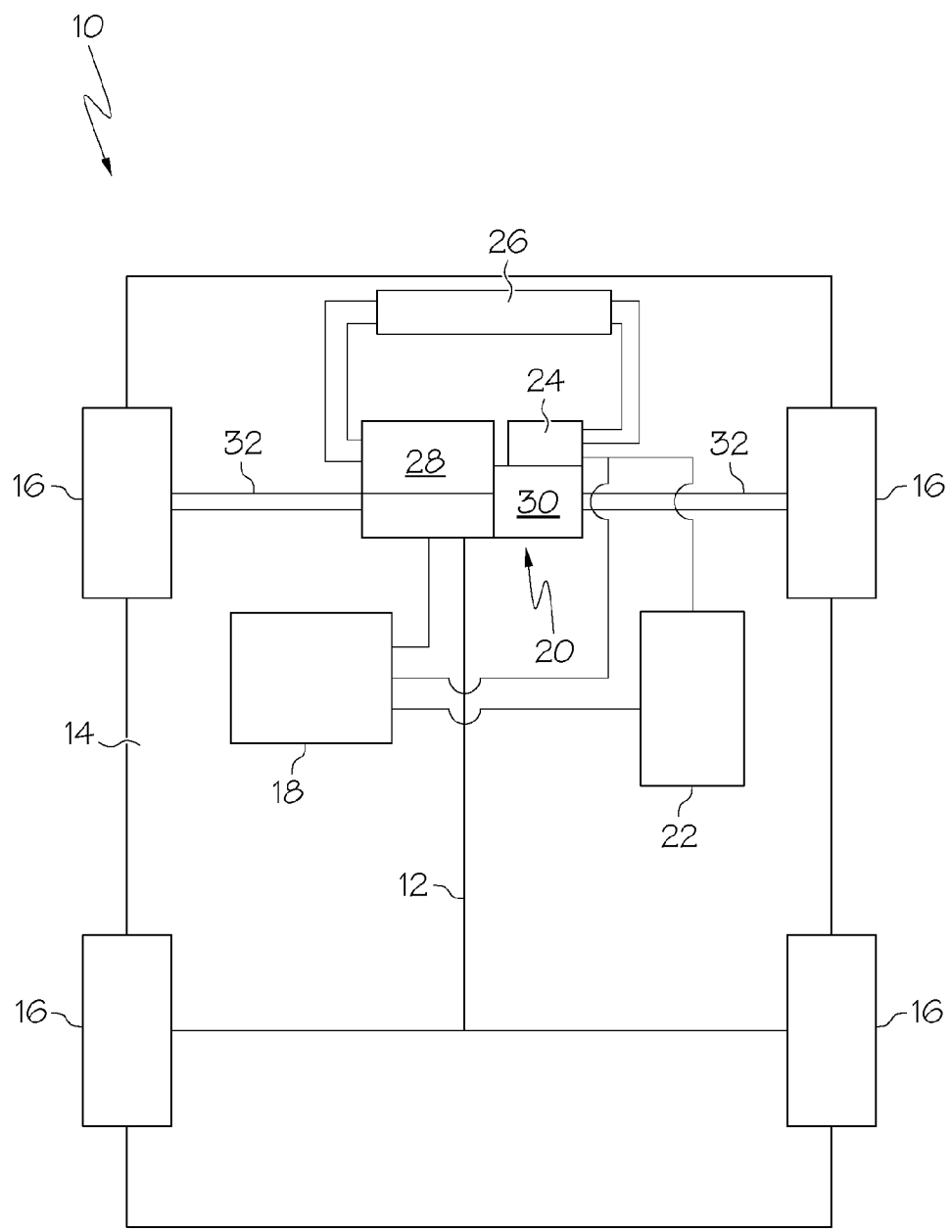
FIG. 1 is a schematic view of an exemplary automobile including a power inverter assembly.

FIG. 1 illustrates a vehicle 10, or "automobile", according to one embodiment of the present invention. The automobile 10 includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, and an electric motor. As will be appreciated by one skilled in the art, in an embodiment in which the automobile 10 is 4WD or AWD, the engine is mechanically coupled to all of the wheels, and the automobile 10 may include numerous additional components which are not shown in FIG. 1.

In the exemplary embodiment illustrated in FIG. 1, the automobile 10 is a hybrid vehicle, and further includes an actuator assembly 20, a battery 22, an inverter assembly 24, and a radiator 26. The actuator assembly 20 includes a combustion engine 28 and an electric motor/generator 30, and as will be described in greater detail below, the inverter assembly 24 is connected to the electric motor 30. As will be appreciated by one skilled in the art, the electric motor 30 includes a transmission therein. The combustion engine 28 and the electric motor 30 are integrated such that both are mechanically coupled to at least some of the wheels 16 through one or more drive shafts 32. The radiator 26 is connected to the frame at an outer portion thereof and although not illustrated in detail, includes multiple cooling channels therethough that contain a cooling fluid (i.e., coolant) such as water and/or ethylene glycol (i.e., "antifreeze) and is coupled to the engine 28 and the inverter assembly 24.

The electronic control system 18 is in operable communication with the actuator 20, the battery 22, and the inverter assembly 24. Although not shown in detail, the electronic control system 18 includes various sensors and automotive control modules, or electronic control units (ECUs), and at least one processor and/or a memory 64 which includes instructions stored thereon (or in another computer-readable medium) for carrying out the processes and methods as described below.

Figure 2:
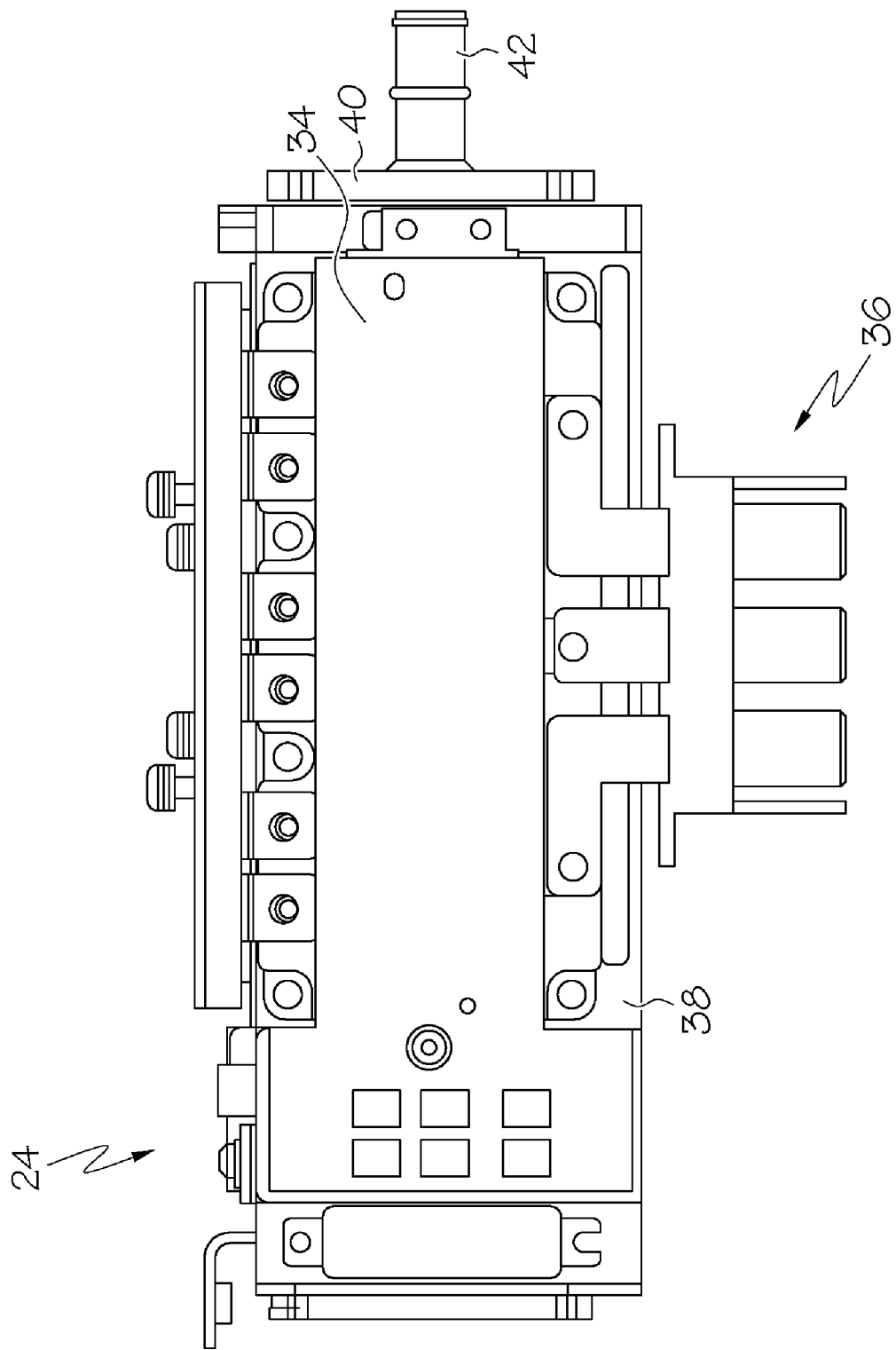
FIG. 2 is a side view of the power inverter assembly of FIG. 1 illustrating a power inverter and a connector assembly connected to the power inverter.

FIG. 2 illustrates the inverter assembly 24, according to one embodiment, in greater detail. The inverter assembly 24 includes a power inverter 34 and a connector assembly 36. In the depicted embodiment, the power inverter 34 includes a housing 38 (or frame) and a fluid port plate 40. The housing 38 is, for example, substantially rectangular with, for example, a length of between 8 and 15 inches, a width of between 3 and 8 inches, and a height of between 3 and 8 inches. In one embodiment, the housing 38 may have a volume of approximately 10 liters (L). However, the size and shape of the housing 38 may vary. The housing 38 is made of a thermally conductive material, such as aluminum or steel, and although not shown, includes a cavity and/or a fluid passageway defined therein. The fluid port plate 40 is mounted to an end of the housing 38 and includes a fluid port 42 extending therefrom and in fluid communication with the cavity and/or the fluid passageway within the housing 38.

Although not shown, the power inverter 34 may also include a capacitor assembly and an input filter within the housing 38, as well as power modules and a controller coupled to the housing 38. The capacitor assembly may include a set, or sets, of conductive plates, in a spaced relationship and wound into coils to form a capacitor, or multiple capacitors, as in commonly understood. The input filter, or electromagnetic interference (EMI) filter, may include a Faraday coil that is electrically coupled to the capacitor(s) within the capacitor assembly 36. Each of the power modules may include a semiconductor substrate (e.g., silicon substrate) with an integrated circuit, having a plurality of semiconductor devices (e.g., transistors and/or switches), formed thereon. The controller may include a microprocessor, as is commonly understood, for controlling the operation of the inverter assembly 24 as described below.

Figure 3:
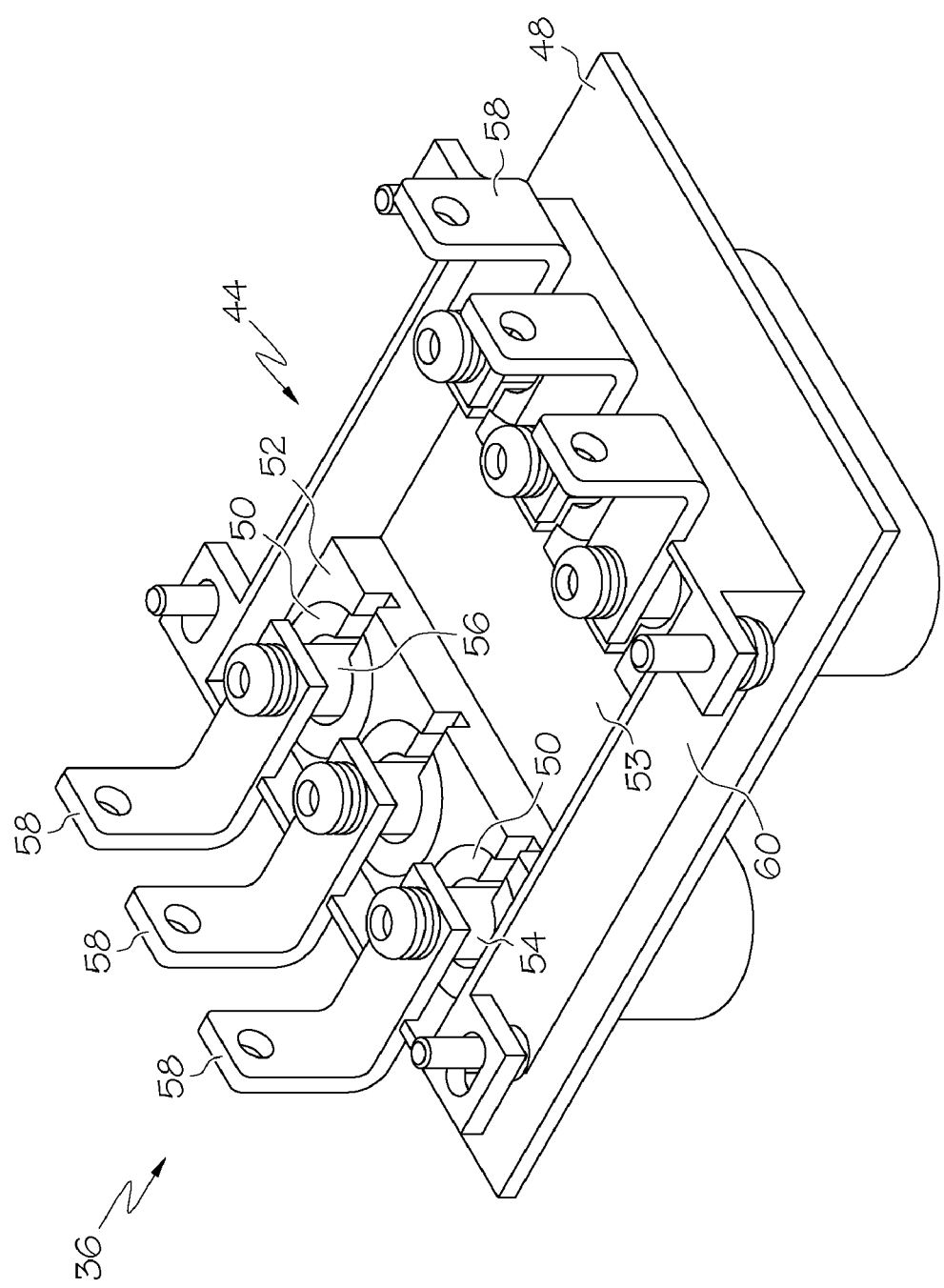
FIG. 3 is an isometric view of a first side of the connector assembly of FIG. 2.
Figure 4:
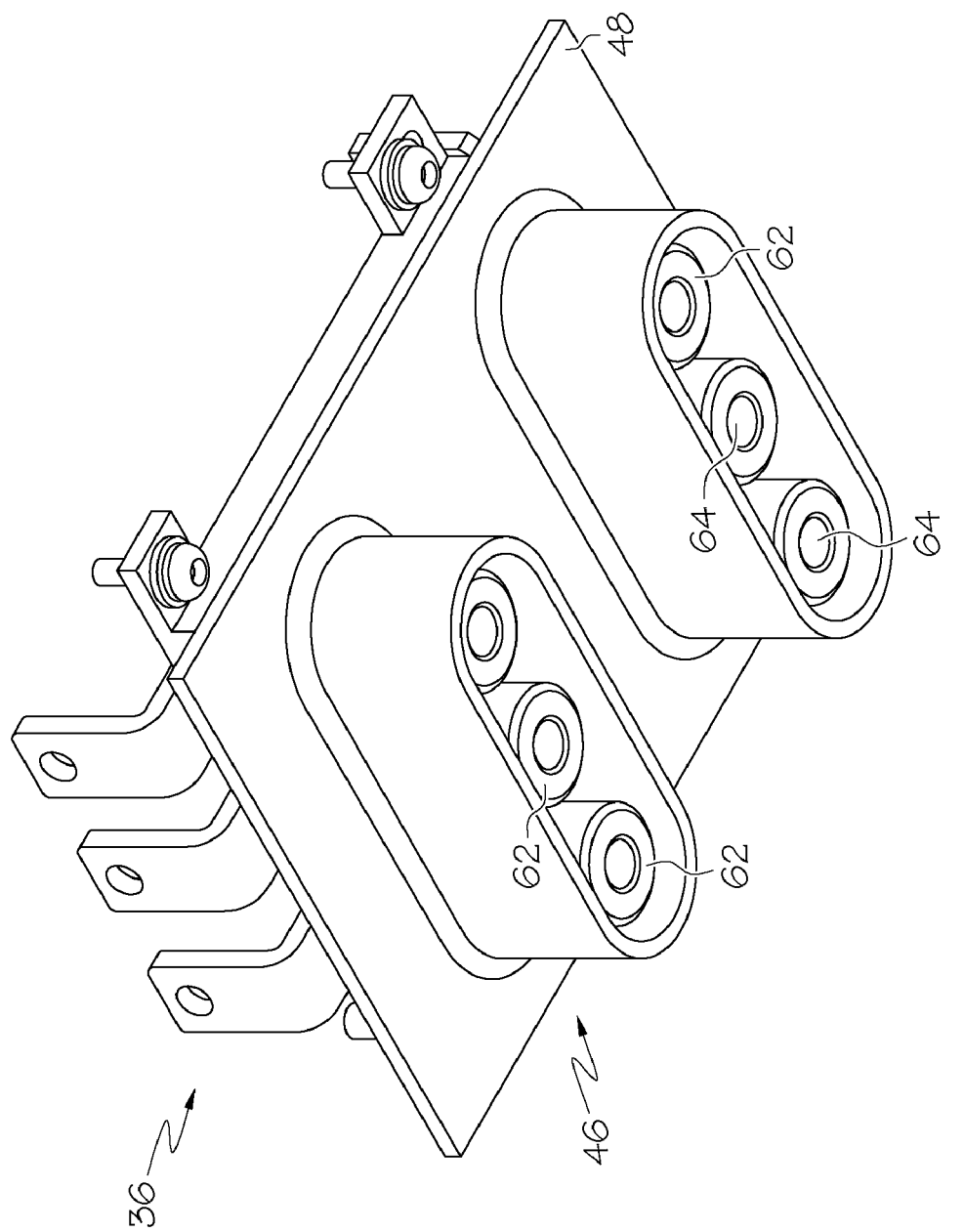
FIG. 4 is an isometric view of a second side of the connector assembly of FIG. 2.
Figure 5:
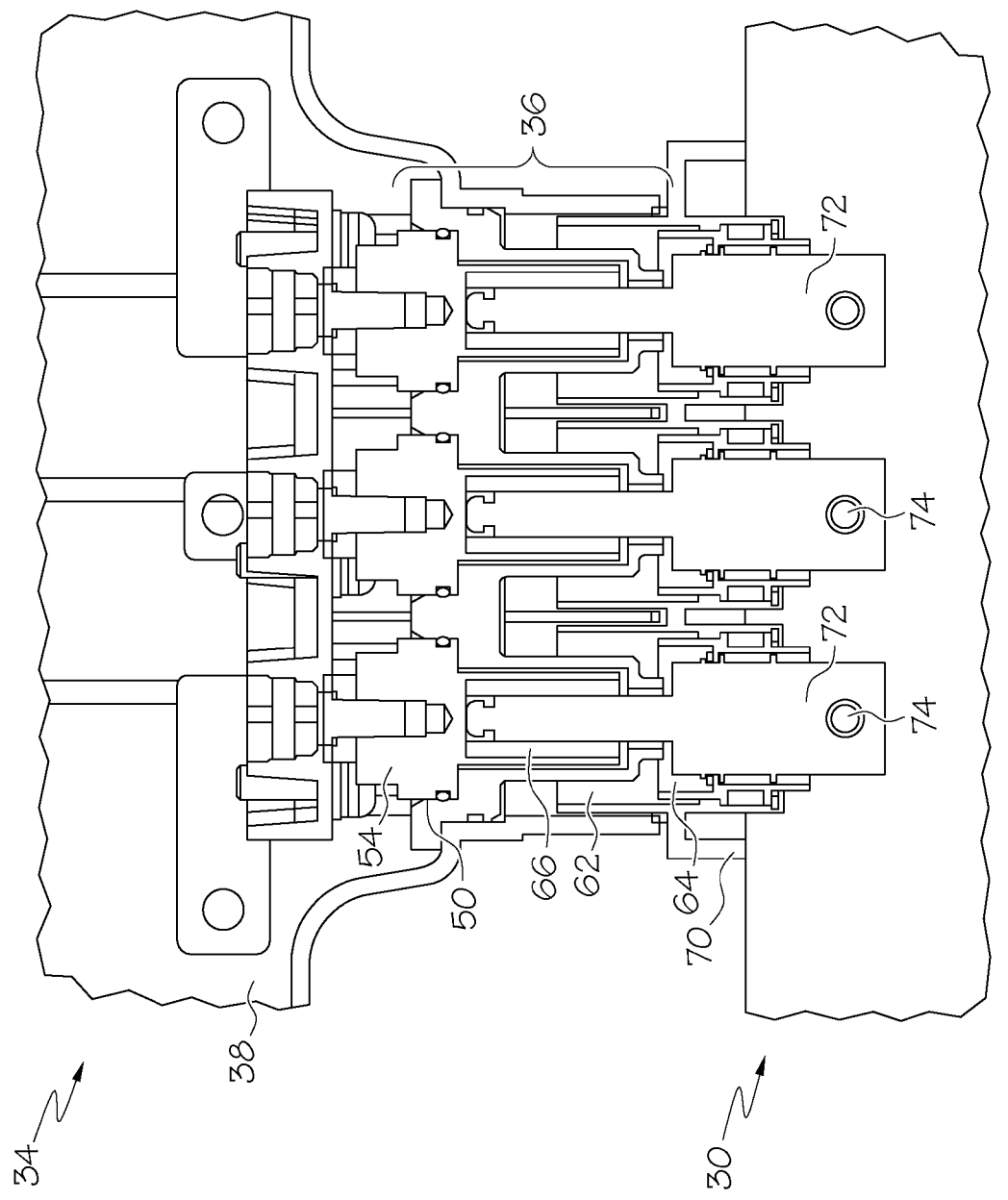
FIG. 5 is a cross-sectional side view of the connector assembly of FIG. 2 interconnecting the power inverter and an electric motor.

FIGS. 3, 4, and 5 illustrate the connector assembly 36 in greater detail. It should be noted that FIG. 3 specifically illustrates a first, or upper, side 44 of the connector assembly 36 (i.e., facing and being adjacent to the housing 34 as shown in FIG. 2) and FIG. 4 illustrates a second, or lower, side 46 (i.e., facing away from the housing 34) of the connector assembly 36. FIG. 5 illustrates, in cross-section, the connector assembly 36 interconnecting the power inverter 34 and the electric motor 30.

The connector assembly 36 includes a connector plate 48 having a plurality of openings 50 therethrough. In the embodiment shown in FIGS. 3 and 4, the connector assembly 36 includes six openings 50 that are arranged in two sets of three openings 50. Two rectangular raised portions 52 extend from the connector plate 48 around each set of openings 50 on opposing sides of a central portion 53 of the connector plate 48. Each of the openings 50 extends to an upper surface of the corresponding raised portion 52. A current sensor 54 is positioned within each opening 50 on the first side 44 of the connector assembly 36. In one embodiment, the current sensors 54 are annularly shaped with openings therethrough and made from a magnetic material (i.e., magnetic rings). Although not shown, the current sensors are in operable communication with the controller of the power inverter 34 and/or the electronic control system 18 of the vehicle 10. The openings in the current sensors 54 are substantially concentric with the openings 50 through the connector plate 48. As shown most clearly in FIG. 3, a cylindrical conductor 56 extends through the opening of each current sensor 54, as well as the openings 50 in the connector plate 48. Conductive "L-shaped" bus bars 58 are attached to upper portions of each of the conductors 56 and extend away from the central portion 53 of the connector plate 48 and the current sensors 54. A side wall 60 extends from the connector plate 48 on the first side 44 of the connector assembly 36 to laterally enclose the raised portions 52 and the central portion 53 of the connector plate 48.

Referring to FIGS. 4 and 5, on the second side 46 of the connector assembly 36, six cylindrically shaped engagement formations 62 extend from the connector plate 48. Each of the engagement formations is adjacent to one of the openings 50 shown in FIG. 3 and are similarly arranged in two sets of three engagement formations 62. The engagement formations 62 have openings 64 therethrough that extend to the conductors 56, with a spring 66 being housed within a spring cavity of each opening 64. The sets of engagement formations 62 are laterally enclosed by sleeves 68 that extend from the connector plate 48. The connector plate 48, the side wall 60, the engagement formations 62, and the sleeves 68 may jointly form a connector plate housing or frame.

Referring to FIGS. 3 and 5, the bus bars 58 are connected (e.g., using screws) to the housing 38 to detachably secure, at least in part, the connector assembly 36 to the housing 38.

Although not illustrated, it should be understood that the bus bars 58 are electrically coupled to the components of the power inverter 34 described above.

Referring now to FIGS. 4 and 5, the electric motor 30 includes a motor housing 70 and a plurality of motor pins 72. The motor pins 72 are connected to the motor housing 70 and include motor winding interfaces 74 on inner portions thereof within the motor housing 70. Although not shown, the motor winding interfaces 74 are electrically coupled to a conductive winding, or coil, within the electric motor 30. Each of the motor pins 72 is mated with a respective one of the engagement formations 62, as the motor pins 72 frictionally slide into the openings 64 from the second side 46 of the connector assembly 36. As such, the connector assembly 36 mechanically interconnects the power inverter 34 and the electric motor 30. As shown in FIG. 5, the housing of the connector assembly 36 is contact with the housing 38 of the power inverter 34 and the housing 70 of the electric motor 30.

Within each engagement formation 62, the respective motor pin 72 contacts the conductor 56 within the corresponding opening 50 such that each motor pin 72 is electrically coupled to the power inverter 34 through the conductors 56 and the bus bars 58. Thus, the connector assembly 36 also electrically couples the power inverter 34 to the electric motor 30.

During operation, referring again to FIG. 1, the vehicle 10 is operated by providing power to the wheels 16 with the combustion engine 28 and the electric motor 30 in an alternating manner and/or with the combustion engine 28 and the electric motor 30 simultaneously. In order to power the electric motor 30, direct current (DC) power is provided from the battery 22 to the inverter assembly 24 (i.e., the power inverter 34), which converts the DC power into alternating current (AC) power, before the power is sent to the electric motor 24.

Referring again to FIG. 5, as current flows from the power inverter 34 to the motor 30, the current passes through the conductors 56 and is monitored by the current sensors 54. The current sensors 54 generate control signals that are sent to the controller of the power inverter 34 and/or the electronic control system 18 of the vehicle 10 which appropriately regulate the power provided to the motor 30.

One advantage of the connector assembly described above is that because the current sensors are integrated therein, a wiring harness is not required to connect the power inverter to a separate current sensor. Thus, the space occupied by the inverter assembly is reduced and the manufacturing costs of the vehicle are minimized while providing a simplified, and thus more serviceable, inverter assembly. Another advantage is that because of the close proximity of the power inverter to the electric motor, the resistance experienced by the current as it flows between the inverter and the motor is minimized. As a result, vehicle performance and efficiency are improved.

Other embodiments may utilize the inverter connector in other types of automobiles than hybrid vehicles and in conjunction with other electrical systems, such as a power steering system or an air conditioning system. The inverter connector may also be used in vehicles other than automobiles, such as aircraft and watercraft, or any system with multiple electrical systems that requires a conversion between DC and AC power.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A vehicular drive system comprising:
an electric motor comprising a plurality of motor engagement formations;
a power inverter comprising a plurality of inverter engagement formations; and
a connector assembly comprising:
a housing;
a plurality of first engagement formations on the housing mated with the plurality of inverter engagement formations on the power inverter;
a plurality of second engagement formations on the housing mated with the plurality of motor engagement formations on the electric motor;
a plurality of conductors connected to the housing, the plurality of conductors interconnecting the first engagement formations and the second engagement formations; and
a plurality of current sensors connected to the housing and configured to detect current flowing between the vehicular power inverter and the vehicular motor through the plurality of conductors.

2. The vehicular drive system of claim 1, wherein the first engagement formations are configured to detachably secure the housing to the power inverter and the second engagement formations are configured to releasably attach the housing to the electric motor.

3. The vehicular drive system of claim 2, wherein each of the plurality of conductors interconnects a respective one of the first engagement formations and a respective one of the second engagement formations.

4. The vehicular drive system of claim 3, wherein each of the plurality of current sensors is configured to detect current flowing between respective first and second engagement formations through a respective conductor.

5. The vehicular drive system of claim 4, wherein the housing and the first engagement formations are configured such that when the first engagement formations are mated with the inverter engagement formations on the vehicular power inverter, the housing is substantially adjacent to a housing of the vehicular power inverter.

6. The vehicular drive system of claim 5, wherein the housing and the second engagement formation are configured such that the housing is substantially adjacent to the electric motor.

7. The vehicular drive system of claim 6, wherein the motor engagement formations are conductive pins and the second engagement formations each have an opening therein, the opening of each of the second engagement formations being sized to receive one of the conductive pins.

8. The vehicular drive system of claim 7, further comprising a direct current (DC) power supply coupled to the power inverter.

9. The vehicular drive system of claim 8, wherein the housing has first and second opposing sides, the first engagement formations being on the first side of the housing and the second engagement formations being on the second side of the housing.

10. The vehicular drive system of claim 9, wherein the current sensors have an annular shape and at least a portion of the conductors extend through a respective current sensor.

11. A automotive drive system comprising:
an electric motor comprising a plurality of motor engagement formations;
a power inverter comprising a plurality of inverter engagement formations; and
a connector assembly comprising:
   a housing having first and second opposing sides;
   a plurality of first engagement formations on the first side of the housing mated with the plurality of inverter engagement formations on the power inverter to detachably secure the housing to the power inverter;
   a plurality of second engagement formations on the second side of the housing mated with the plurality of motor engagement formations on the electric motor to releasably attach the housing to the electric motor;
   a plurality of conductors connected to the housing, each of the plurality of conductors interconnecting a respective one of the first engagement formations and a respective one of the second engagement formations; and
   a plurality of current sensors connected to the housing, each of the plurality of current sensors configured to detect current flowing between the vehicular power inverter and the vehicular motor through a respective one of the plurality of conductors.

12. The automotive drive system of claim 11, wherein the housing and the plurality of first engagement formations are configured such that the housing is substantially adjacent to the power inverter.

13. The automotive drive system of claim 12, wherein the motor engagement formations are conductive pins and the second engagement formations each have an opening therein, the opening of each of the second engagement formations being sized to receive one of the conductive pins.

14. The automotive drive system of claim 13, further comprising a direct current (DC) power supply coupled to the power inverter.

15. The automotive drive system of claim 14, wherein the current sensors are magnetic rings and at least a portion of the conductors extend through a respective magnetic ring.

16. An automotive drive system comprising:
a frame;
an actuator coupled to the frame having a plurality of actuator engagement formations;
an automotive power inverter; and
an connector assembly comprising:
   a housing having first and second opposing sides;
   a plurality of first engagement formations on the first side of the housing and connected to the automotive power inverter;
   a plurality of second engagement formations on the second side of the housing mated with the plurality of actuator engagement formations on the actuator to releasably attach the housing to the actuator;
   a plurality of conductors connected to the housing, each conductor interconnecting a respective one of the first engagement formations and a respective one of the second engagement formations; and
   a plurality of current sensors connected to the housing, each current sensor configured to detect current flowing between the automotive power inverter and the actuator through a respective conductor.

17. The automotive drive system of claim 16, wherein the automotive power inverter further comprises a housing and wherein the housing of the connector assembly is substantially adjacent to the housing of the connector assembly.

18. The automotive drive system of claim 17, wherein the actuator further comprises a housing and wherein the housing of the connector assembly is substantially adjacent to the housing of the connector assembly.

19. The automotive drive system of claim 18, wherein the actuator is an electric motor having a conductive coil therein and engagement formations are pins electrically coupled to the conductive coil.

20. The automotive drive system of claim 19, further comprising a combustion engine coupled to the frame and mechanically coupled to the electric motor.

* * * * *